US012206090B2

(12) United States Patent
Kim

(10) Patent No.: US 12,206,090 B2
(45) Date of Patent: Jan. 21, 2025

(54) NEGATIVE ACTIVE MATERIAL FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventor: Young-Min Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/507,330

(22) Filed: Nov. 13, 2023

(65) Prior Publication Data

US 2024/0097102 A1  Mar. 21, 2024

Related U.S. Application Data

(63) Continuation of application No. 16/414,324, filed on May 16, 2019, now abandoned.

(30) Foreign Application Priority Data

May 18, 2018  (KR) .................. 10-2018-0057197

(51) Int. Cl.
| | |
|---|---|
| H01M 4/133 | (2010.01) |
| H01M 4/02 | (2006.01) |
| H01M 4/1393 | (2010.01) |
| H01M 4/38 | (2006.01) |
| H01M 4/583 | (2010.01) |
| H01M 10/0525 | (2010.01) |

(52) U.S. Cl.
CPC ......... *H01M 4/133* (2013.01); *H01M 4/1393* (2013.01); *H01M 4/386* (2013.01); *H01M 4/583* (2013.01); *H01M 10/0525* (2013.01); *H01M 2004/027* (2013.01)

(58) Field of Classification Search
CPC ...... H01M 4/133; H01M 4/134; H01M 4/362; H01M 4/364; H01M 4/366; H01M 4/386; H01M 4/587; H01M 2004/027
See application file for complete search history.

(56) References Cited

U.S. PATENT DOCUMENTS

| 6,344,296 B1 | 2/2002 | Ishii et al. |
| 2005/0214644 A1 | 9/2005 | Aramata et al. |

(Continued)

FOREIGN PATENT DOCUMENTS

| CN | 1717822 A | | 1/2006 |
| CN | 103035915 A | | 4/2013 |
| CN | 105453314 A | | 3/2016 |
| CN | 106558686 | * | 4/2017 |
| JP | 2015-028955 A | | 2/2015 |
| JP | 2016-115418 A | | 6/2016 |

(Continued)

OTHER PUBLICATIONS

English translation of CN Publication 106558686, Apr. 2017.*

(Continued)

*Primary Examiner* — Brittany L Raymond
(74) *Attorney, Agent, or Firm* — Lee IP Law, P.C.

(57) ABSTRACT

A negative active material for a rechargeable lithium battery includes a composite of silicon and crystalline carbon, wherein the silicon has an average particle diameter (D50) of about 10 nm to about 150 nm, and the crystalline carbon has an average particle diameter (D50) of about 5 μm to about 20 μm, and an aspect ratio of about 4 to about 10.

12 Claims, 4 Drawing Sheets

(56) References Cited

U.S. PATENT DOCUMENTS

| | | | |
|---|---|---|---|
| 2006/0003227 A1 | 1/2006 | Aramata et al. | |
| 2006/0035149 A1 | 2/2006 | Nanba et al. | |
| 2013/0089783 A1 | 4/2013 | Yoo et al. | |
| 2013/0302675 A1 | 11/2013 | Kouzu et al. | |
| 2014/0079993 A1 | 3/2014 | Lee et al. | |
| 2014/0335410 A1 | 11/2014 | Loveridge et al. | |
| 2015/0243969 A1 | 8/2015 | Ku et al. | |
| 2016/0190552 A1* | 6/2016 | Murata | H01M 4/134 |
| | | | 429/231.8 |
| 2017/0117539 A1 | 4/2017 | Ogata et al. | |
| 2018/0013146 A1 | 1/2018 | Yamada et al. | |

FOREIGN PATENT DOCUMENTS

| | | |
|---|---|---|
| KR | 10-0446828 B1 | 8/2004 |
| KR | 10-2014-0085822 A | 7/2014 |
| KR | 10-2015-0015086 A | 2/2015 |
| KR | 10-2015-0101310 A | 9/2015 |
| KR | 10-2017-0047095 A | 5/2017 |

OTHER PUBLICATIONS

Chinese Office and Search Report dated Nov. 3, 2021.
Korean Office Action dated Aug. 25, 2021 of the corresponding Korean Patent Application No. 10-2018-0057197.

* cited by examiner

Aspect ratio of artificial graphite

Aspect ratio of negative active material

NEGATIVE ACTIVE MATERIAL FOR RECHARGEABLE LITHIUM BATTERY AND RECHARGEABLE LITHIUM BATTERY INCLUDING THE SAME

CROSS-REFERENCE TO RELATED APPLICATIONS

This is a continuation application based on pending application Ser. No. 16/414,324, filed May 16, 2019, the entire contents of which is hereby incorporated by reference.

Korean Patent Application No. 10-2018-0057197, filed on May 18, 2018, in the Korean Intellectual Property Office, and entitled: "Negative Active Material for Rechargeable Lithium Battery and Rechargeable Lithium Battery Including Same," is incorporated by reference herein in its entirety.

BACKGROUND

1. Field

Embodiments are directed to a negative active material for a rechargeable lithium battery and a rechargeable lithium battery including the same.

2. Description of the Related Art

Technology development for realizing high capacity of a rechargeable lithium battery has been continuously made due to an increasing demand on a mobile equipment or a portable battery.

As an electrolyte of a rechargeable lithium battery, a lithium salt dissolved in an organic solvent has been used.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for a negative active material, various carbon materials capable of intercalating/deintercalating lithium such as artificial graphite, natural graphite and hard carbon or a Si-based active material such as Si, Sn, and the like may be used. In recent years, as high capacity batteries, particularly high capacity per unit volume, are required, a high specific capacity of the negative electrode is required. Accordingly, research has been conducted on using a composite of silicon and carbon for the negative electrode. However, the composite of silicon and carbon has a problem that the volume expansion occurs remarkably during charging and discharging.

SUMMARY

Embodiments are directed to a negative active material for a rechargeable lithium battery, the negative active material comprising a composite of silicon and crystalline carbon, wherein the silicon has an average particle diameter (D50) of about 10 nm to about 150 nm, and the crystalline carbon has an average particle diameter (D50) of about 5 μm to about 20 μm, and an aspect ratio of about 4 to about 10.

The negative active material may have an aspect ratio of about 1 to about 2.5.

The silicon has an average particle diameter (D50) of about 40 nm to about 120 nm.

The crystalline carbon may have an average particle diameter (D50) of about 5 μm to about 10 μm.

A mixing ratio of the silicon and the crystalline carbon may be a weight ratio of about 1:9 to about 9:1.

The silicon-carbon composite may further include an amorphous carbon coating layer on the surface thereof.

An amount of the amorphous carbon coating layer may be about 10 wt % to about 60 wt % based on total 100 wt % of the negative active material.

Embodiments are also directed to a rechargeable lithium battery including a negative electrode including the negative active material described above, a positive electrode including a positive active material, and a non-aqueous electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
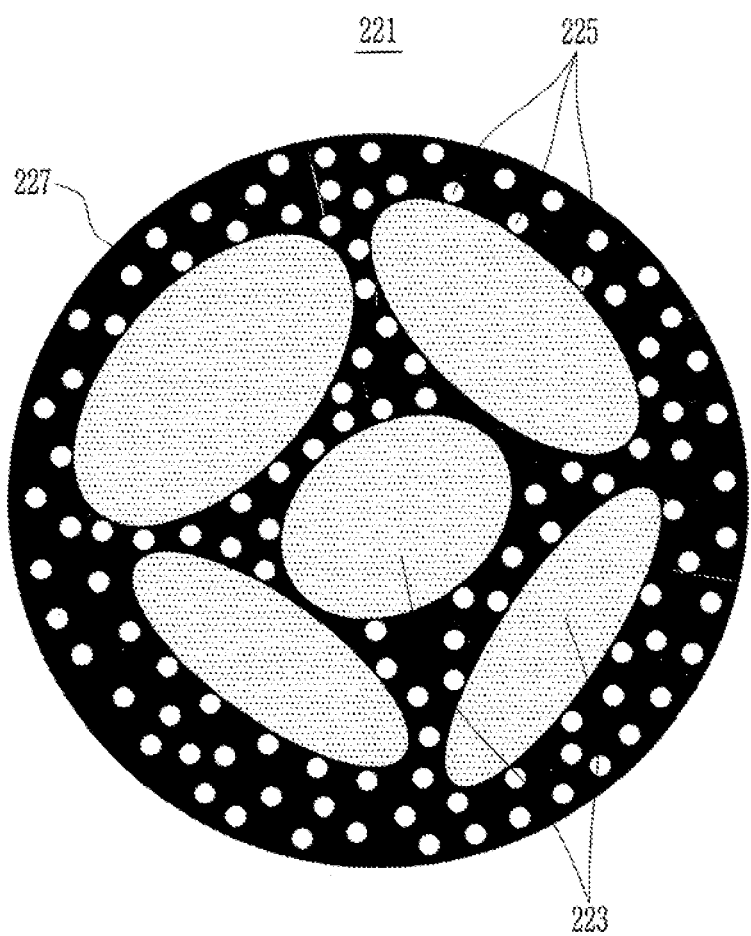
FIG. 1 illustrates a schematic view showing a structure of a negative active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Like reference numerals refer to like elements throughout.

A negative active material for a rechargeable lithium battery according to an embodiment includes a composite of silicon and crystalline carbon, wherein the silicon has an average particle diameter (D50) of about 10 nm to about 150 nm and the crystalline carbon has an average particle diameter (D50) of about 5 μm to about 20 μm, and an aspect ratio of about 4 to about 10.

As used herein, when a definition is not otherwise provided, an average particle diameter (D50) indicates a particle diameter where a cumulative volume in a particle distribution is about 50 volume %.

The silicon may have an average particle diameter (D50) of about 10 nm to about 150 nm. In some implementations, the silicon may have an average particle diameter (D50) of about 40 nm to about 120 nm. When the average particle diameter (D50) of the silicon is within the ranges, a deterioration of cycle-life characteristics may be minimized or avoided.

The crystalline carbon may have an average particle diameter (D50) of about 5 μm to about 20 μm, or, for example, about 5 μm to about 10 μm. When the average particle diameter (D50) of the crystalline carbon with the ranges, deterioration of cycle-life characteristics may be minimized or avoided.

The crystalline carbon may have an aspect ratio of about 4 to about 10. When the crystalline carbon has an aspect ratio within the range, a severe expansion of a negative electrode including this active material and thus an excessive volume increase thereof, that is, deteriorated swelling characteristics that could occur during the charge and discharge of a rechargeable lithium battery including the negative electrode may be minimized or avoided.

The aspect ratio may be determined from photographic images taken with CP-SEM.

In the silicon-carbon composite of the negative active material according to an embodiment, the average particle diameter (D50) of silicon, the average particle diameter (D50) of crystalline carbon, and the aspect ratio of the crystalline carbon are controlled within the above-mentioned ranges. For example, the silicon-carbon composite may include the silicon having an average particle diameter (D50) and the crystalline carbon having a specific average particle diameter (D50) and a specific aspect ratio. In this case, Si may be more uniformly dispersed to improve cycle-life characteristics and swelling characteristics.

In a negative active material according to an embodiment, the negative active material composite may have an aspect ratio of about 1 to about 2.5 In some implementations, the aspect ratio may be about 1 to about 2. When the silicon-carbon composite has an aspect ratio within the range, a negative active material may expand in a more uniform direction. Thus, the expansion of the negative active material in an electrode may be effectively reduced.

In addition, when the silicon-carbon composite including silicon having the aforementioned specific average particle diameter (D50) and crystalline carbon having a specific average particle diameter (D50) and a specific aspect ratio has an aspect ratio of about 1 to about 2.5, cycle-life characteristics and swelling characteristics may be further improved.

The crystalline carbon may be natural graphite, artificial graphite, or a combination thereof.

In an embodiment, in the silicon-carbon composite, the silicon and the crystalline carbon may be used in a weight ratio of about 1:9 to about 9:1. In some implementations, the weight ratio may be about 5:5 to about 8:2. When the silicon and the crystalline carbon are mixed within the weight ratio range, more excellent capacity and higher capacity than that of a general crystalline carbon negative active material may be realized. In addition, when the weight ratio is about 5:5 to about 8:2, a much higher capacity may be obtained.

The silicon-carbon composite may further include an amorphous carbon coating layer on the surface. The amorphous carbon may be petroleum pitch, coal pitch, or a combination thereof. The amorphous carbon coating layer may have a thickness of about 5 nm to about 1,000 nm. The negative active material includes about 10 wt % to about 60 wt % of an amorphous carbon layer based on 100 wt % of a total weight of the negative active material.

When an amorphous carbon coating layer is further formed on the surface of the silicon-carbon composite, conductivity of the silicon-carbon composite may be further improved, and thus performance may be improved. In addition, a direct contact between silicon and an electrolyte may be reduced, and thus, a resistance increase due to a generation of byproducts may be effectively suppressed.

The silicon-carbon composite may include a pore. For example, as an illustration of a structure of the silicon-carbon composite, a crystalline carbon core internally including a pore, an amorphous carbon shell formed on the surface of the core, Si particles dispersed inside the pore, and amorphous carbon present inside the pore may be provided.

The structure of the silicon-carbon composite is schematically shown in FIG. 1 as an example. A silicon-carbon composite 221 shown in FIG. 1 includes crystalline carbon 223, silicon 225, and amorphous carbon 227, wherein the amorphous carbon 227 is present among assemblies of the crystalline carbon 223 and the silicon 225 and in addition, surrounds the surfaces of the assemblies.

In addition, the silicon-carbon composite may internally include a pore. The pore may be pipe-shaped or sheet-shaped and may form a mesh network inside the core. In the silicon-carbon composite, porosity may be appropriately adjusted. For example, porosity may range from about 2 volume % to about 50 volume % based on a total volume of the silicon-carbon composite.

A negative active material according to the embodiment may be prepared by mixing silicon particles and artificial graphite and optionally, amorphous carbon in a solvent and then, spray-drying and heat-treating this mixed solution. The solvent may be isopropyl alcohol, ethanol, methanol, or a combination thereof. The spray drying process may be performed at about 90° C. to about 120° C., and the heat treatment process may be performed at about 900° C. to about 1,000° C. The heat treatment process may be performed under an $N_2$ atmosphere, an argon atmosphere, a $H_2$ atmosphere, or a combination thereof.

When the mixed solution drying process is performed by spray-drying, powder may be easily obtained through a mass production.

When the spray dry process is performed within the temperature range, a solvent may be easily volatilized and removed. When the heat treatment process is performed within the temperature range, conductivity of a negative active material may be improved, and the strength thereof may be maintained. When amorphous carbon is used, the amorphous carbon may be carbonized and thus may increase the effect of improving conductivity of the negative active material and maintaining strength thereof.

The negative active material according to an embodiment may include the composite as a first active material and may include crystalline carbon as a second active material. The crystalline carbon may be artificial graphite, natural graphite, or a combination thereof. When an active material is prepared through mixing in this way, high-capacity may be obtained without deteriorating performance. A mixing ratio of the first active material and the second active material may be appropriately adjusted, for example, in a weight ratio of about 10:90 to about 40:60.

According to an embodiment, a rechargeable lithium battery may include a negative electrode; a positive electrode; and an electrolyte.

The negative electrode may include a current collector and a negative active material layer formed on the current collector and including the negative active material.

In the negative active material layer, the negative active material may be included in an amount of about 95 wt % to about 99 wt % based on the total weight of the negative active material layer.

The negative active material layer may include a binder, and optionally, a conductive material. In the negative active material layer, an amount of the binder may be about 1 wt % to about 5 wt % based on a total weight of the negative active material layer. When the negative active material layer further includes the conductive material, the negative active material layer may include about 90 wt % to about 98 wt % of the negative active material, about 1 wt % to about 5 wt % of the binder, and about 1 wt % to about 5 wt % of the conductive material.

The binder may improve binding properties of negative active material particles with one another and with a current collector. The binder may include a non-aqueous binder, an aqueous binder, or a combination thereof.

The non-aqueous binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may include a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as the negative electrode binder, a cellulose-based compound may be further used as a thickener to provide viscosity. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material may be included to provide electrode conductivity. Any electrically conductive material that does not cause a chemical change may be used as a conductive material. Examples of the conductive material include a carbon material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative, or a mixture thereof.

The current collector may include one selected from a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector and including a positive active material.

The positive active material may be a compound (lithiated intercalation compound) that is capable of intercalating and deintercalating lithium. For example, the positive active material may be one or more composite oxides of a metal selected from cobalt, manganese, nickel, and a combination thereof, and lithium. For example, the positive active material may have a compound represented by one of the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (90≤a≤1.8, 0≤b≤0.5, 0≤c≤0.05); $Li_aE_{2-b}X_bO_{4-c}D_c$ (90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8).

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. By using these elements in the compound, the coating layer may be disposed in a method having no adverse influence on properties of a positive active material. For example, the method may include a suitable coating method such as spray coating, dipping, or the like.

In the positive electrode, the amount of the positive active material may be about 90 wt % to about 98 wt % based on the total weight of the positive active material layer.

The positive active material layer may further include a binder and a conductive material. The amount of each of the binder and the conductive material may be about 1 wt % to about 5 wt % based on the total weight of the positive active material layer.

The binder may serve to adhere the positive active material particles with one another and to adhere the positive active material to a current collector. Examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause a chemical change may be used as a conductive material. Examples of the conductive material may include a carbon material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative, or the like, or a mixture thereof.

The current collector may include, for example, an aluminum foil, a nickel foil, or a combination thereof.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent includes cyclohexanone or the like. The alcohol-based solvent include ethyl alcohol, isopropyl alcohol, or the like. Examples of the aprotic solvent may include a nitrile such as R—CN (where R is a C2 to C20 linear, branched, or cyclic hydrocarbon group, or may include a double bond, an aromatic ring, or an ether bond), an amide such as dimethylformamide, dioxolanes such as 1,3-dioxolane, a sulfolane, or the like.

The organic solvent may be used alone or in a mixture. When the organic solvent is used in a mixture, the mixture ratio may be controlled in accordance with a desirable battery performance.

When the non-aqueous organic solvent is used in a mixture, the mixture may be a mixed solvent of a cyclic carbonate and a linear (chain) carbonate, a mixed solvent of a cyclic carbonate and a propionate based solvent, or a mixed solvent of a cyclic carbonate, linear carbonate, and a propionate based solvent. The propionate based solvent may be methylpropionate, ethylpropionate, propylpropionate, or a combination thereof.

When the cyclic carbonate and the linear carbonate or the cyclic carbonate and the propionate based solvent are mixed, they may be mixed in a volume ratio of about 1:1 to about 1:9. Thus, performance of an electrolyte solution may be improved. When the cyclic carbonate, the linear carbonate, and the propionate based solvent are mixed, they may be mixed in a volume ratio of about 1:1:1 to about 3:3:4. The mixing ratios of the solvents may be appropriately adjusted according to desirable properties.

The organic solvent may further include an aromatic hydrocarbon-based organic solvent in addition to the carbonate-based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

[Chemical Formula 1]

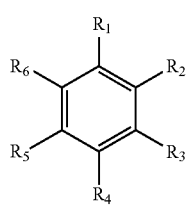

In Chemical Formula 1, $R_1$ to $R_6$ may be the same or different and may be selected from hydrogen, a halogen, a C1 to C10 alkyl group, a haloalkyl group, or a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include an additive for improving the cycle-life of a battery. The additive may be or include vinylene carbonate or an ethylene carbonate-based compound of Chemical Formula 2.

Chemical Formula 2

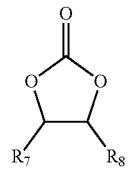

In Chemical Formula 2, $R_7$ and $R_8$ may be the same or different and may be selected from hydrogen, a halogen, a cyano group (CN), a nitro group ($NO_2$), or a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within a suitable range.

The lithium salt dissolved in an organic solvent supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example, an integer ranging from 1 to 20), LiCl, LiI, and $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material include polyethylene, polypropylene, polyvinylidene fluoride, and multi-layers thereof having two or more layers. The separator may be a mixed multilayer such as a polyethylene/polypropylene double-layered separator, a polyethylene/polypropylene/polyethylene triple-layered separator, or a polypropylene/polyethylene/polypropylene triple-layered separator.

Figure 2:
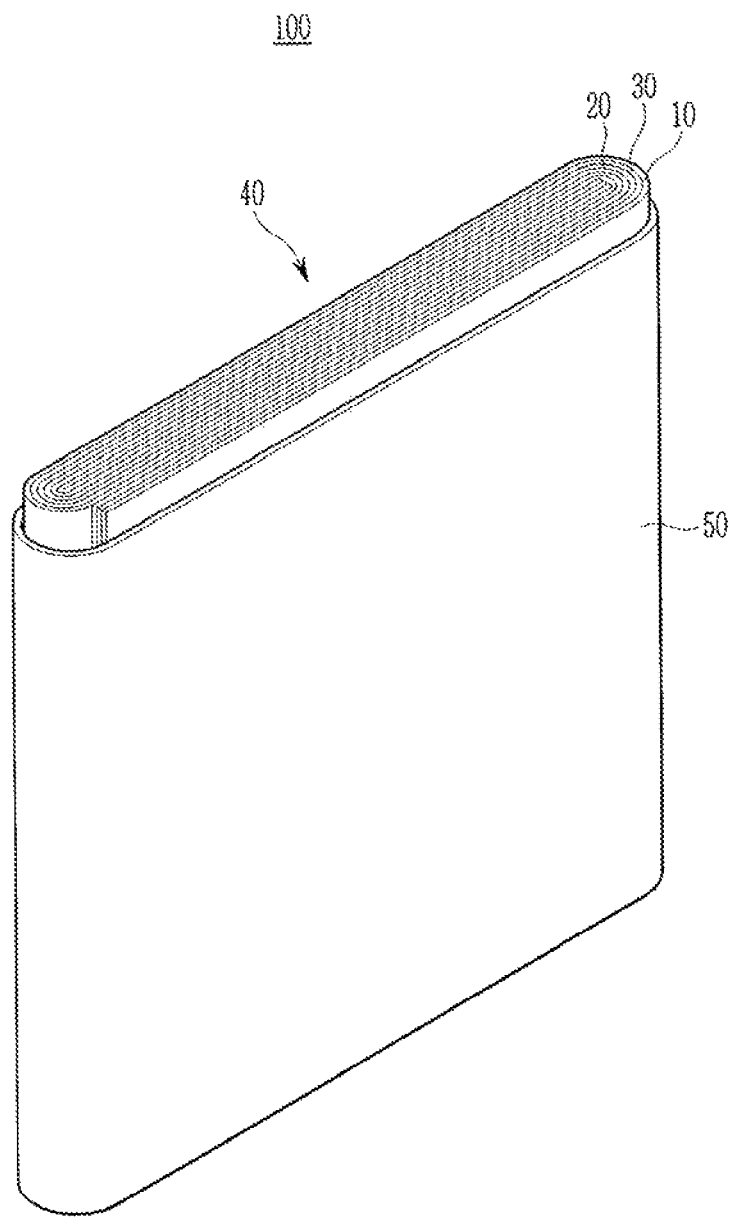
FIG. 2 illustrates a schematic view showing a structure of a rechargeable lithium battery according to an embodiment.

FIG. 2 illustrates an exploded, cutaway perspective view of a rechargeable lithium battery according to an embodiment (not showing a cap plate, electrode tabs, etc. of a complete battery). The rechargeable lithium battery according to an embodiment is illustrated as a prismatic battery as an example. The rechargeable lithium battery may be one of variously-shaped batteries such as a cylindrical battery, a pouch battery, or the like.

Referring to FIG. 2, a rechargeable lithium battery 100 according to an embodiment may include an electrode assembly 40 manufactured by winding a separator 30 disposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Examples 1 to 6, Comparative Examples 1 to 5, and Reference Example 1

Artificial graphite having an average particle diameter (D50) and an aspect ratio shown in Table 1, silicon particles having an average particle diameter (D50) shown in Table 1, and petroleum pitch amorphous carbon in a weight ratio of 40:40:20 were mixed in an isopropyl alcohol solvent and dispersed by using a homogenizer to prepare a dispersion.

The dispersion was spray-dried at 120° C. by using a spray dryer.

The resulting spray-dried product was heat-treated at 1,000° C. in a furnace under an $N_2$ atmosphere to form a core of artificial graphite and silicon particles and an amorphous carbon layer on the surface of the core.

The obtained product was pulverized and sieved using a 400 mesh to produce a first negative active material including a silicon-carbon composite core of artificial graphite and silicon particles and an amorphous carbon layer formed on the surface of the core. This first negative active material was a negative active material including an artificial graphite core including pores thereinside, an amorphous carbon shell formed on the surface of the core, Si particles inside the pores, and an amorphous carbon structure inside the pores. In the prepared first negative active material, a weight ratio of silicon particles and artificial graphite was 5:5. In addition, in the prepared first negative active material, an amount of the amorphous carbon coating layer was 20 wt % based on 100 wt % of a total weight of the first negative active material, and a thickness of the amorphous carbon layer was 30 nm.

15 wt % of the first negative active material and 85 wt % of natural graphite second negative active material were mixed to obtain a mixed negative active material.

94 wt % of the obtained mixed negative active material, 3 wt % of denka black, and 3 wt % of a polyvinylidene fluoride binder were mixed in an N-methyl pyrrolidone solvent to prepare negative active material slurry. The slurry was coated onto a Cu foil current collector, dried and compressed to manufacture a negative electrode.

A half-cell having a 1 C capacity of 3,600 mAh was manufactured using the negative electrode, a lithium metal counter electrode, and an electrolyte. The electrolyte was prepared by dissolving 1.0 M $LiPF_6$ in ethylene carbonate and diethyl carbonate (volume ratio of 50:50).

Evaluation of Aspect Ratio of Negative active Material

Figures 3A, 3B:
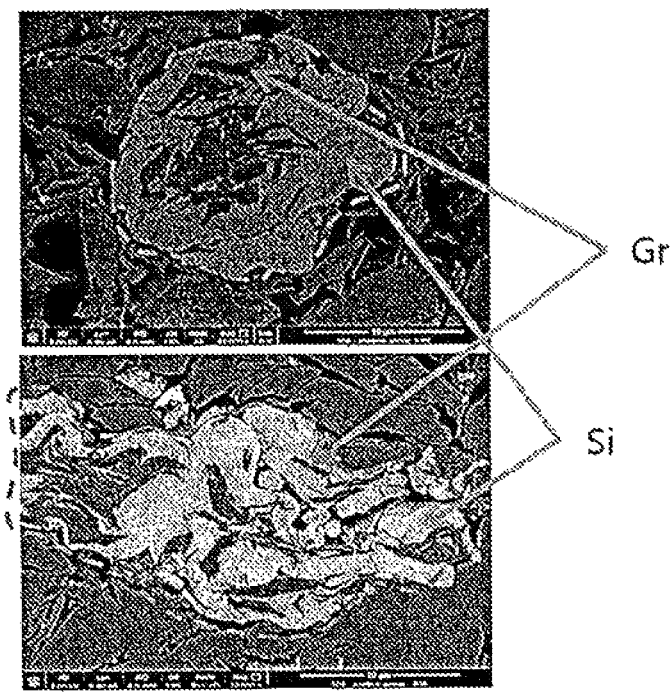
FIGS. 3A and 3B illustrate a CP-SEM (Controlled Pressure Scanning Electron Microscope) images of the negative active materials manufactured according to Example 1(a) and Reference Example 1(b).
Figure 4A:
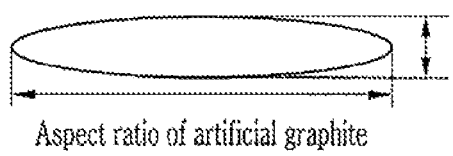
FIGS. 4A and 4B illustrate views explaining an aspect ratio of artificial graphite and a negative active material in the CP-SEM images of FIGS. 3A and 3B.
Figure 4B:
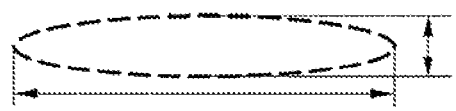

CP-SEM photographic images of the negative active materials of Example 1 and Reference Example 1 were obtained. The images are respectively shown as FIGS. 3A and 3B. In FIGS. 3A and 3B, Si indicates silicon, and Gr indicates graphite. Referring to the CP-SEM images, an aspect ratio of the artificial graphite (refer to FIG. 4A was determined. In addition, an aspect ratio of the negative active material (refer to FIG. 4B) was determined. The results are shown in Table 1. In FIGS. 3A and 3B, the region indicated by the arrow with the symbol "Gr" is used to determine the aspect ratio of the artificial graphite as shown in FIG. 4A, and the region marked with the dotted line is used to determine the aspect ratio of the negative active material as shown in FIG. 4B.

Evaluation of Cycle-life Characteristics

Half-cells including negative electrodes including each negative active material manufactured according to Examples 1 to 6, Comparative Examples 1 to 5, and Reference Example 1 were charged and discharged at 0.5 C for 100 times. Capacity ratios (%) of the discharge capacity of the 100th charge and discharge cycle relative to the discharge capacity of the first charge and discharge cycle are shown in Table 1 as cycle-life values.

Thickness Expansion Rate

Half-cells manufactured by using negative electrodes respectively including the negative active materials according to Examples 1 to 6, Comparative Examples 1 to 5, and Reference Example 1 were charged and discharged 50 times at 0.5 C. The thickness of each of the battery cells was respectively measured before the charge and discharge and after the 50 times charges and discharges. Then, a thickness ratio based on the thickness after the 50 charges and discharges relative to the thickness before the charge and discharge was calculated. The results are shown as an expansion rate in Table 1.

TABLE 1

| | Average particle diameter of Si (D50, nm) | Average particle diameter of artificial graphite (D50) (μm) | Aspect ratio of artificial graphite | Aspect ratio of negative active material | Cycle-life (%) | Expansion rate (%) |
|---|---|---|---|---|---|---|
| Comparative Example 1 | 100 | 5 | 1-3 | 1-2.5 | 73 | 31 |
| Comparative Example 2 | 100 | 5 | 1-3 | 3-7 | 65 | 41 |
| Reference Example 1 | 100 | 5 | 4-10 | 3-7 | 66 | 43 |
| Comparative Example 3 | 100 | 20 | 4-10 | 3-7 | 63 | 44 |
| Comparative Example 4 | 100 | 27 | 4-10 | 1-2.5 | 69 | 36 |
| Comparative Example 5 | 200 | 5 | 4-10 | 1-2.5 | 72 | 34 |
| Example 1 | 100 | 5 | 4-10 | 1-2.5 | 83 | 23 |
| Example 2 | 100 | 9 | 4-10 | 1-2.5 | 81 | 26 |
| Example 3 | 100 | 20 | 4-10 | 1-2.5 | 78 | 27 |
| Example 4 | 50 | 5 | 4-10 | 1-2.5 | 86 | 19 |
| Example 5 | 50 | 9 | 4-10 | 1-2.5 | 83 | 21 |
| Example 6 | 50 | 20 | 4-10 | 1-2.5 | 81 | 24 |

As can be seen in Table 1, battery cells including negative active materials including silicon having an average particle diameter (D50) of 10 nm to 150 nm and artificial graphite having an average particle diameter (D50) of 5 μm to 20 μm and an aspect ratio of 4 to 10, and in addition, having an aspect ratio of 1 to 2.5 with specific values according to Examples 1 to 6, exhibited excellent cycle-life characteristics and a low expansion rate compared with battery cells including negative active materials according to Comparative Examples 1 to 6 and Reference Example 1, which were outside of the values.

Examples 7 to 14 and Reference Example 2

Artificial graphite having an average particle diameter (D50) and an aspect ratio shown in Table 2, silicon particles having an average particle diameter (D50) shown in Table 2, and petroleum pitch amorphous carbon in a weight ratio were mixed in an isopropyl alcohol solvent and dispersed by using a homogenizer to prepare a dispersion. A weight ratio of the silicon particles and the artificial graphite was adjusted as shown in Table 2. In addition, an amount of the amorphous carbon was adjusted, so that a coating layer might have an amount shown in Table 2 in a final first negative active material.

The dispersion was spray-dried at 120° C. using a spray dryer.

The resulting spray-dried product was heat-treated at 1,000° C. in a furnace under an $N_2$ atmosphere to form a core of artificial graphite and silicon particles and an amorphous carbon layer on the surface of the core.

The obtained product was pulverized and sieved using a 400 mesh to produce a first negative active material including a silicon-carbon composite core of artificial graphite and silicon particles and an amorphous carbon layer formed on the surface of the core. This first negative active material was a negative active material including an artificial graphite core including pores thereinside, an amorphous carbon shell formed on the surface of the core, Si particles inside the pores, and an amorphous carbon structure inside the pores. In the produced first negative active material, weight ratios of silicon particles and artificial graphite according to examples are shown in Table 2. The amount of the amorphous carbon coating layer in the produced first negative active material is shown in Table 2.

15 wt % of the first negative active material and 85 wt % of natural graphite as a second negative active material were mixed to obtain a mixed negative active material.

94 wt % of the obtained mixed negative active material, 3 wt % of denka black, and 3 wt % of a polyvinylidene fluoride binder were mixed in an N-methyl pyrrolidone solvent to prepare negative active material slurry. The slurry was coated onto a Cu foil current collector, dried and compressed to manufacture a negative electrode.

A half-cell having a 1 C capacity of 3,600 mAh was manufactured using the negative electrode, a lithium metal counter-electrode, and an electrolyte. The electrolyte was prepared by dissolving 1.0 M $LiPF_6$ in ethylene carbonate and diethyl carbonate (volume ratio of 50:50).

Evaluation of Cycle-life Characteristics

Half-cells including negative electrodes respectively including the negative active material manufactured according to Examples 7 to 14 and Reference Example 2 were charged and discharged at 0.5 C for 100 times. Capacity ratios (%) of the discharge capacity of the 100th charge and discharge cycle relative to the discharge capacity of the first charge and discharge cycle are shown in Table 2 as a cycle-life value.

Thickness Expansion Rate

Half-cells including negative electrodes respectively including the negative active materials according to Examples 7 to 14 and Reference Example 2 were charged and discharged 50 times at 0.5 C. The thickness of the battery cells was respectively measured before and after the 50 time charging and discharging. Then, the thickness ratio of the thickness after 50 times charging and discharging relative to the thickness before the charges and discharges was calculated, and the results are shown as an expansion rate in Table 2.

TABLE 2

| | Average particle diameter of Si (D50) (nm) | Average particle diameter of artificial graphite D50 (μm) | Aspect ratio of artificial graphite | Aspect ratio of negative active material | Si:artificial graphite (weight ratio) | Amount of amorphous carbon coating layer (wt % based on a total amount, 100 wt % of negative active material) | Cycle-life (%) | Expansion rate (%) |
|---|---|---|---|---|---|---|---|---|
| Example 7 | 100 | 5 | 4-10 | 1-2.5 | 1:9 | 10 | 86 | 19 |
| Example 8 | 100 | 5 | 4-10 | 1-2.5 | 9:1 | 10 | 76 | 38 |
| Example 9 | 100 | 5 | 4-10 | 1-2.5 | 5:5 | 10 | 80 | 26 |
| Example 10 | 100 | 5 | 4-10 | 1-2.5 | 4:6 | 10 | 83 | 24 |
| Example 11 | 100 | 5 | 4-10 | 1-2.5 | 1:9 | 60 | 88 | 16 |
| Example 12 | 100 | 5 | 4-10 | 1-2.5 | 9:1 | 60 | 79 | 35 |
| Example 13 | 100 | 5 | 4-10 | 1-2.5 | 5:5 | 60 | 86 | 18 |
| Example 14 | 100 | 5 | 4-10 | 1-2.5 | 4:6 | 60 | 87 | 17 |
| Reference Example 2 | 100 | 5 | 4-10 | 1-2.5 | 5:5 | 5 | 70 | 37 |

As can be seen in Table 2, the battery cells using the negative active material including silicon having an average particle diameter (D50) of 10 nm to 150 nm and artificial graphite having an average particle diameter (D50) of 5 μm to 20 μm and an aspect ratio of 4 to 10 and in addition, having an aspect ratio of 1 to 2.5 and including an amorphous carbon coating layer in an amount of 10 wt % to 60 wt % according to Examples 7 to 14 exhibited excellent cycle-life characteristics compared with the battery cell including a negative active material including an amorphous carbon coating layer in too a small amount of 5 wt % according to Reference Example 2. For example, in case of Reference Example 2, which has the amount of the amorphous carbon coating layer of 5 wt %, Greatly deteriorated cycle-life characteristics were exhibited.

By way of summation and review, as an electrolyte of a rechargeable lithium battery, a lithium salt dissolved in an organic solvent has been used.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ ($0<x<1$), and the like has been used.

As for a negative active material, various carbon materials capable of intercalating/deintercalating lithium such as artificial graphite, natural graphite and hard carbon or a Si-based active material such as Si, Sn, or the like may be used. In recent years, as high capacity batteries, particularly high capacity per unit volume, become desirable, a high specific capacity of the negative electrode is desired. Accordingly, research has been conducted on using a composite of silicon and carbon for the negative electrode. However, the composite of silicon and carbon may have disadvantages that a volume expansion occurs remarkably during charging and discharging.

Embodiments may provide a negative electrode for a rechargeable lithium battery capable of suppressing expansion during charge and discharge effectively and exhibiting excellent cycle-life characteristics.

Embodiments provide a rechargeable lithium battery including the negative active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material consisting of a composite of silicon and crystalline carbon, and an amorphous carbon coating layer on the surface of the composite, wherein:
   the silicon has an average particle diameter (D50) of 10 nm to 150 nm,
   the crystalline carbon has an average particle diameter (D50) of 5 μm to 20 μm, and an aspect ratio of 4 to 10,
   the negative active material has an aspect ratio of 1 to 2.5, and
   the aspect ratio is measured by CP-SEM images.

2. The negative active material as claimed in claim 1, wherein the silicon has an average particle diameter (D50) of 40 nm to 120 nm.

3. The negative active material as claimed in claim 1, wherein the crystalline carbon has an average particle diameter (D50) of 5 μm to 10 μm.

4. The negative active material as claimed in claim 1, wherein a mixing ratio of the silicon and the crystalline carbon is a weight ratio of 1:9 to 9:1.

5. The negative active material as claimed in claim 1, wherein a mixing ratio of the silicon and the crystalline carbon is a weight ratio of 1:9 to 5:5.

6. The negative active material as claimed in claim 1, wherein an amount of the amorphous carbon coating layer is 10 wt % to 60 wt %, based on a total weight of the negative active material.

7. The negative active material as claimed in claim 1, wherein an amount of the amorphous carbon coating layer is 20 wt % to 60 wt %, based on a total weight of the negative active material.

8. The negative active material as claimed in claim 1, wherein an amount of the amorphous carbon coating layer is 30 wt % to 60 wt %, based on a total weight of the negative active material.

9. A negative active material layer, comprising:

95 to 99 wt % of a negative active material; and 1 wt % to 5 wt % of a binder at a weight ratio, all wt % being based on a total weight of the negative active material layer, wherein:

the negative active material consists of:
   the active material of claim 1 as a first active material, and
   crystalline carbon as a second active material,
the first active material and the second active material are included in a weight ratio of 10:90 to 40:60.

10. The negative active material layer as claimed in claim 9, further comprising a conductive material.

11. The negative active material layer as claimed in claim 10, wherein a weight ratio of the negative active material, the binder, and the conductive material is 90 to 98:1 to 5:1 to 5.

12. A rechargeable lithium battery, comprising a negative electrode including the negative active material as claimed in claim 1;

a positive electrode including a positive active material; and a non-aqueous electrolyte.

* * * * *